(12) United States Patent
Wang

(10) Patent No.: US 7,113,672 B2
(45) Date of Patent: Sep. 26, 2006

(54) WAVELENGTH DIVISION MULTIPLEXED (WDM) COUPLER AND METHOD FOR MAKING THE SAME

(75) Inventor: Chin-Hsiang Wang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/217,370

(22) Filed: Sep. 2, 2005

(65) Prior Publication Data
US 2006/0067614 A1    Mar. 30, 2006

(30) Foreign Application Priority Data
Sep. 27, 2004    (TW) .............................. 93129231 A

(51) Int. Cl.
*G02B 6/32*    (2006.01)
*G02B 6/28*    (2006.01)
(52) U.S. Cl. .............................. 385/34; 385/24; 385/33
(58) Field of Classification Search ................... 385/33, 385/34
See application file for complete search history.

(56) References Cited

U.S. PATENT DOCUMENTS

| 2004/0001713 A1* | 1/2004 | Ting et al. ..................... 398/48 |
| 2004/0091210 A1* | 5/2004 | Tanaka et al. ................. 385/34 |
| 2004/0114932 A1* | 6/2004 | Tanaka et al. ................. 398/85 |
| 2004/0252941 A1* | 12/2004 | Hsia et al. ..................... 385/34 |

* cited by examiner

*Primary Examiner*—Michelle Connelly-Cushwa
(74) *Attorney, Agent, or Firm*—Birch, Stewart, Kolasch & Birch, LLP

(57) ABSTRACT

A WDM coupler includes an optical collimating module disposed in an outer tube unit. The optical collimating module includes adhesive bonds made from UV-curing epoxy for bonding together an optical filter component and a first collimating lens, the optical filter component and a second collimating lens, the first collimating lens and a first fiber pigtail, and the second collimating lens and a second fiber pigtail. A method for making the WDM coupler is also disclosed.

12 Claims, 13 Drawing Sheets

WAVELENGTH DIVISION MULTIPLEXED (WDM) COUPLER AND METHOD FOR MAKING THE SAME

CROSS-REFERENCE TO RELATED APPLICATION

This application claims priority of Taiwanese application no. 093129231, filed on Sep. 27, 2004.

BACKGROUND OF THE INVENTION

1. Field of the Invention

The invention relates to a component for use in wavelength division multiplexing applications, more particularly to a wavelength division multiplexed (WDM) coupler and to a method for making the same.

2. Description of the Related Art

Referring to FIG. 1, a conventional WDM coupler disclosed in U.S. Pat. No. 6,185,347 is shown to include a WDM filter 1, first and second gradient-index (GRIN) lenses 2, 3, a dual fiber pigtail 4, and a single fiber pigtail 5. During manufacture, the first and second GRIN lenses 2, 3 and the WDM filter 1 are first fixed together by applying a heat-curing epoxy 6. Then, after adjusting the relative positions of the first GRIN lens 2 and the dual fiber pigtail 4 to obtain a lowest possible reflection loss for the dual fiber pigtail 4, the dual fiber pigtail 4 is fixed to the first GRIN lens 2 by applying a heat-curing epoxy 601. Subsequently, after adjusting the relative positions of the second GRIN lens 3 and the single fiber pigtail 5 to obtain a lowest possible insertion loss for the single fiber pigtail 5, the single fiber pigtail 5 is fixed to the second GRIN lens 3 by applying a heat-curing epoxy 602.

In the aforesaid conventional WDM coupler, the heat-curing epoxies 6, 601, 602 require a relatively long curing time. Hence, the heat-curing epoxies 6, 601, 602 are likely to spread over confronting end surfaces of the first and second GRIN lenses 2, 3 and the WDM filter 1, confronting end surfaces of the first GRIN lens 2 and the dual fiber pigtail 4, and confronting end surfaces of the second GRIN lens 3 and the single fiber pigtail 5 during the epoxy curing process, which can lead to inferior optical signal transmission.

Referring to FIG. 2, another conventional WDM coupler is shown to include an inner metal tube 7 formed with three sets of weld holes 701, 702, 703. An optical filter unit 8, a dual fiber collimator 9, and a single fiber collimator 101 are mounted in the inner metal tube 7. The optical filter unit 8 includes a ring 801 and a filter component 802. The dual fiber collimator 9 includes a first GRIN lens 901, a dual fiber pigtail 902, a glass tube 903, and a collimator tube 904. The single fiber collimator 101 includes a second GRIN lens 102, a single fiber pigtail 103, a glass tube 104, and a collimator tube 105. The inner metal tube 7 is disposed in an outer metal tube 106. During manufacture, the filter component 802 is bonded adhesively to the ring 801 to form the optical filter unit 8, and the optical filter unit 8 is inserted into the inner metal tube 7 such that the ring 801 is registered with the weld holes 701 in the inner metal tube 7. The weld holes 701 are then filled with solder material to fix the optical filter unit 8 in the inner metal tube 7. To prepare the dual fiber collimator 9, the first GRIN lens 901 and the dual fiber pigtail 902 are inserted into the glass tube 903 and, after adjusting the relative positions of the first GRIN lens 901 and the dual fiber pigtail 902 to obtain a lowest possible reflection loss for the dual fiber collimator 9, the first GRIN lens 901 and the dual fiber pigtail 902 are fixed in the glass tube 903 with the use of an adhesive. Thereafter, the glass tube 903 is fixed in the collimator tube 904 with the use of an adhesive. The dual fiber collimator 9 thus prepared is inserted into the inner metal tube 7 such that the collimator tube 904 is registered with the weld holes 702 in the inner metal tube 7, and the weld holes 702 are filled with solder material to fix the dual fiber collimator 9 in the inner metal tube 7. To prepare the single fiber collimator 101, the second GRIN lens 102 and the single fiber pigtail 103 are inserted into the glass tube 104 and, after adjusting the relative positions of the second GRIN lens 102 and the single fiber pigtail 103 for beam alignment, the second GRIN lens 102 and the single fiber pigtail 103 are fixed in the glass tube 104 with the use of an adhesive. Thereafter, the glass tube 104 is fixed in the collimator tube 105 with the use of an adhesive. The single fiber collimator 101 thus prepared is inserted into the inner metal tube 7 such that the collimator tube 105 is registered with the weld holes 703 in the inner metal tube 7 and such that the single fiber collimator 101 is disposed in the inner metal tube 7 at a position corresponding to a lowest possible insertion loss for the single fiber collimator 101, and the weld holes 703 are filled with solder material to fix the single fiber collimator 101 in the inner metal tube 7. Finally, the inner metal tube 7 is inserted into the outer metal tube 106, and the opposite ends of the outer metal tube 106 are sealed.

Some of the drawbacks of the aforementioned conventional WDM coupler, which can be used to join or split optical signals having different wavelengths, are listed as follows:

1. While it is possible for the WDM coupler of FIG. 2 to alleviate the problem of undesired spreading of epoxy over component surfaces that is commonly encountered in the conventional WDM coupler of FIG. 1, numerous additional components are required, such as: the ring 801 for positioning the filter component 802; the glass tubes 903, 104 and the collimator tubes 904, 105 for positioning the first and second GRIN lenses 901, 102 relative to the dual fiber pigtail 902 and the single fiber pigtail 103; and the inner metal tube 7 having the optical filter unit 8, the dual fiber collimator 9 and the single fiber collimator 101 welded thereto. In addition, because the first and second GRIN lenses 901, 102 are separate from the filter component 802, the structure of the conventional WDM coupler of FIG. 2 is not only more complicated, the axial length and radial dimensions of the conventional WDM coupler of FIG. 2 are increased as well, which result in a larger size for the conventional WDM coupler of FIG. 2.

2. In view of the need to fix the optical filter unit 8, the dual fiber collimator 9 and the single fiber collimator 101 separately in the inner metal tube 7, the manufacturing process is not only lengthened, the heat generated when fixing each of the aforesaid components in the inner metal tube 7 can damage the adhesive bonds among the various components, e.g., those among the first GRIN lens 901, the dual fiber pigtail 902 and the glass tube 903 of the dual fiber collimator 9, which can lead to relative movement among the various components and which in turn can affect the quality of optical signal transmission.

3. As described hereinabove, the manufacturing process for the conventional WDM coupler of FIG. 2 requires the optical filter unit 8, the dual fiber collimator 9 and the single fiber collimator 101 to be assembled separately prior to fixing in the inner metal tube 7. The manufacturing process as such is both troublesome and time-consuming.

SUMMARY OF THE INVENTION

Therefore, the object of the present invention is to provide a WDM coupler which has a simple yet compact construction and which exhibits good optical signal transmission characteristics.

Another object of the present invention is to provide a method for making a WDM coupler, which is convenient to conduct and which can avoid component damage due to high temperatures.

According to one aspect of the invention, a WDM coupler comprises an outer tube unit, and an optical collimating module disposed in the outer tube unit. The optical collimating module includes:

an optical filter component having first and second filter end surfaces opposite to each other in a longitudinal direction, and a surrounding wall surface extending between and interconnecting the first and second filter end surfaces;

first and second collimating lenses, each of which has a filter confronting end surface, a pigtail confronting end surface opposite to the filter confronting end surface in the longitudinal direction, and a surrounding wall surface extending between and interconnecting the filter confronting end surface and the pigtail confronting end surface;

a first adhesive bond made from UV-curing epoxy and formed on the surrounding wall surfaces of the optical filter component and the first collimating lens proximate to the first filter end surface of the optical filter component and the filter confronting end surface of the first collimating lens so as to fix the optical filter component and the first collimating lens together in the longitudinal direction;

a second adhesive bond made from UV-curing epoxy and formed on the surrounding wall surfaces of the optical filter component and the second collimating lens proximate to the second filter end surface of the optical filter component and the filter confronting end surface of the second collimating lens so as to fix the optical filter component and the second collimating lens together in the longitudinal direction;

first and second fiber pigtails, each of which has a lens confronting end surface, a distal end surface opposite to the lens confronting end surface in the longitudinal direction, and a surrounding wall surface extending between and interconnecting the lens confronting end surface and the distal end surface;

a third adhesive bond made from UV-curing epoxy and formed on the surrounding wall surfaces of the first collimating lens and the first fiber pigtail proximate to the pigtail confronting end surface of the first collimating lens and the lens confronting end surface of the first fiber pigtail so as to fix the first collimating lens and the first fiber pigtail together in the longitudinal direction; and a fourth adhesive bond made from UV-curing epoxy and formed on the surrounding wall surfaces of the second collimating lens and the second fiber pigtail proximate to the pigtail confronting end surface of the second collimating lens and the lens confronting end surface of the second fiber pigtail so as to fix the second collimating lens and the second fiber pigtail together in the longitudinal direction.

According to another aspect of the invention, a method for making a WDM coupler comprises: A) forming an optical collimating module; and B) disposing the optical collimating module in an outer tube unit. Step A) includes:

a) forming a first adhesive bond for fixing an optical filter component and a first collimating lens together in a longitudinal direction by applying UV-curing epoxy on surrounding wall surfaces of the optical filter component and the first collimating lens proximate to a first filter end surface of the optical filter component and a filter confronting end surface of the first collimating lens, and by subsequently curing the UV-curing epoxy;

b) forming a second adhesive bond for fixing the optical filter component and a second collimating lens together in the longitudinal direction by applying the UV-curing epoxy on the surrounding wall surface of the optical filter component proximate to a second filter end surface of the optical filter component that is opposite to the first filter end surface in the longitudinal direction, and on a surrounding wall surface of the second collimating lens proximate to a filter confronting end surface of the second collimating lens, and by subsequently curing the UV-curing epoxy;

c) forming a third adhesive bond for fixing the first collimating lens and a first fiber pigtail together in the longitudinal direction by applying the UV-curing epoxy on the surrounding wall surface of the first collimating lens proximate to a pigtail confronting end surface of the first collimating lens that is opposite to the optical filter component in the longitudinal direction, and on a surrounding wall surface of the first fiber pigtail proximate to a lens confronting end surface of the first fiber pigtail, and by subsequently curing the UV-curing epoxy; and d) forming a fourth adhesive bond for fixing the second collimating lens and a second fiber pigtail together in the longitudinal direction by applying the UV-curing epoxy on the surrounding wall surface of the second collimating lens proximate to a pigtail confronting end surface of the second collimating lens that is opposite to the optical filter component in the longitudinal direction, and on a surrounding wall surface of the second fiber pigtail proximate to a lens confronting end surface of the second fiber pigtail, and by subsequently curing the UV-curing epoxy.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
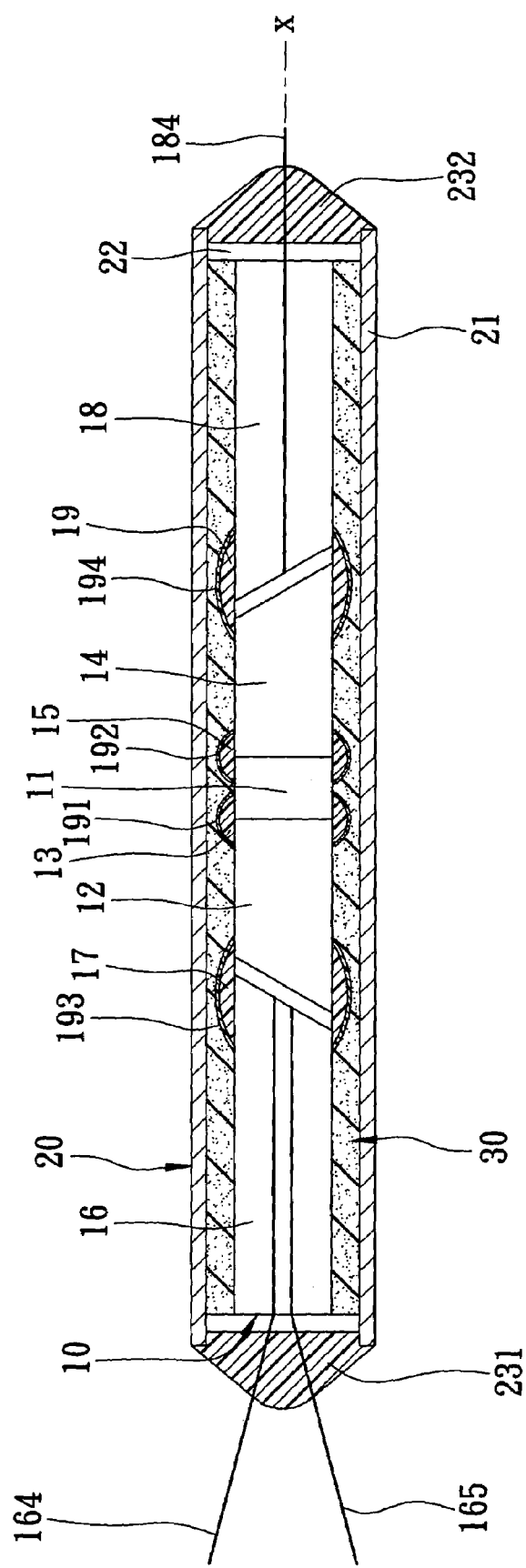
FIG. 3 is a partly sectional, schematic view of the preferred embodiment of a WDM coupler according to the present invention.
Figure 4:
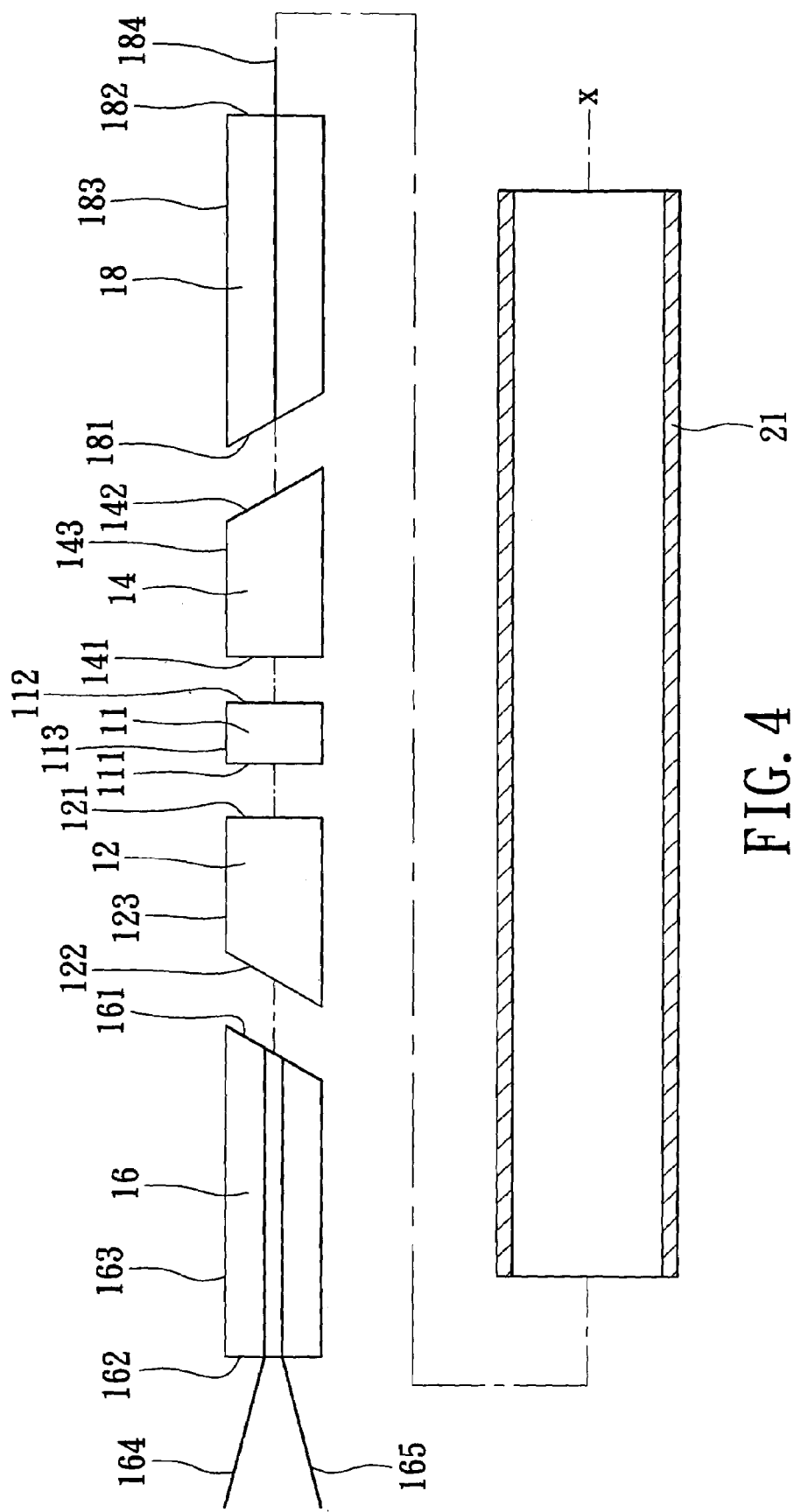
FIGS. 4 to 13 illustrate consecutive steps of the method for making the WDM coupler of FIG. 3.

Referring to FIGS. 3 and 4, the preferred embodiment of a WDM coupler according to the present invention, which can be used to join or split optical signals having different wavelengths, is shown to comprise an optical collimating module 10, an outer tube unit 20, and a positioning body 30.

The optical collimating module 10 includes an optical filter component 11, a first collimating lens 12, a second collimating lens 14, a first fiber pigtail 16, and a second fiber pigtail 18.

The optical filter component 11 has first and second filter end surfaces 111, 112 opposite to each other in a longitudinal direction (x), and a surrounding wall surface 113 extending between and interconnecting the first and second filter end surfaces 111, 112.

In this embodiment, each of the first and second collimating lenses 12, 14 is a known gradient-index (GRIN) lens. The first collimating lens 12 has a filter confronting end surface 121, a pigtail confronting end surface 122 opposite to the filter confronting end surface 121 in the longitudinal direction (x), and a surrounding wall surface 123 extending between and interconnecting the filter confronting end surface 121 and the pigtail confronting end surface 122. The second collimating lens 14 has a filter confronting end surface 141, a pigtail confronting end surface 142 opposite to the filter confronting end surface 141 in the longitudinal direction (x), and a surrounding wall surface 143 extending between and interconnecting the filter confronting end surface 141 and the pigtail confronting end surface 142.

Figure 5:
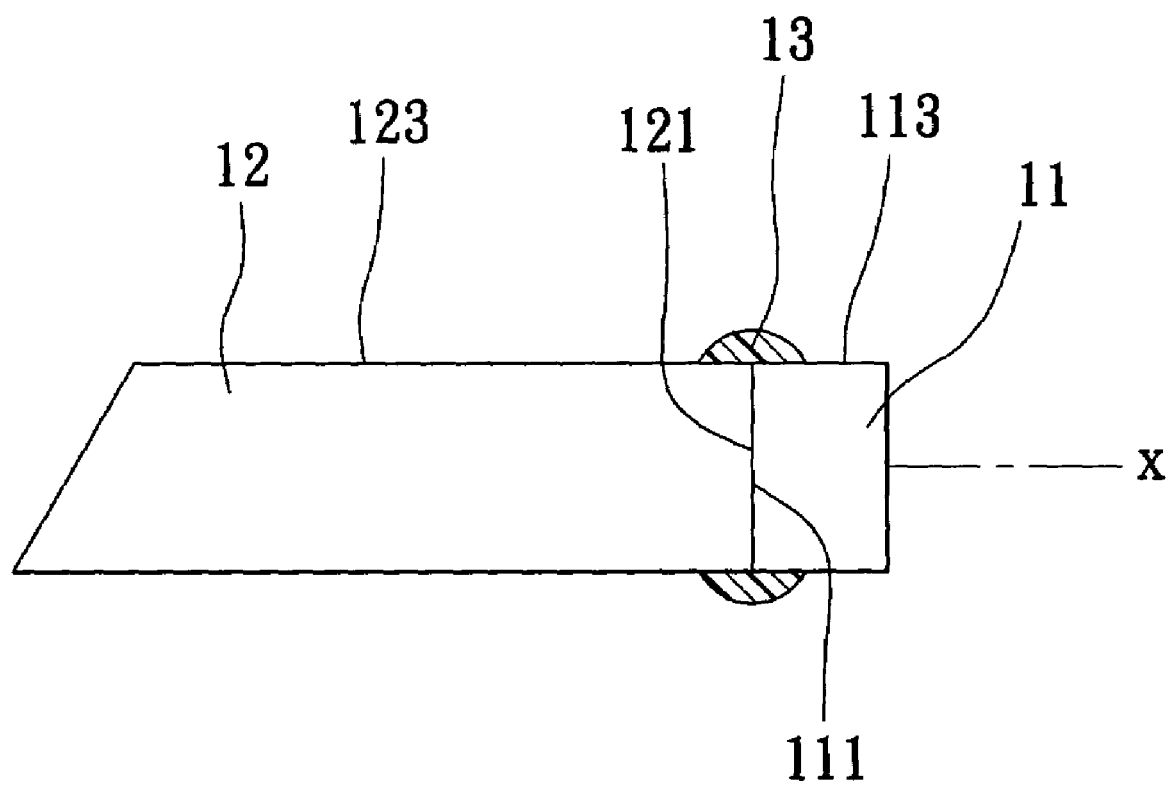

A first adhesive bond 13, which is made from UV-curing epoxy, is formed on the surrounding wall surfaces 113, 123 of the optical filter component 11 and the first collimating lens 12 proximate to the first filter end surface 111 of the optical filter component 11 and the filter confronting end surface 121 of the first collimating lens 12 so as to fix the optical filter component 11 and the first collimating lens 12 together in the longitudinal direction (x), as best shown in FIG. 5.

Figure 6:
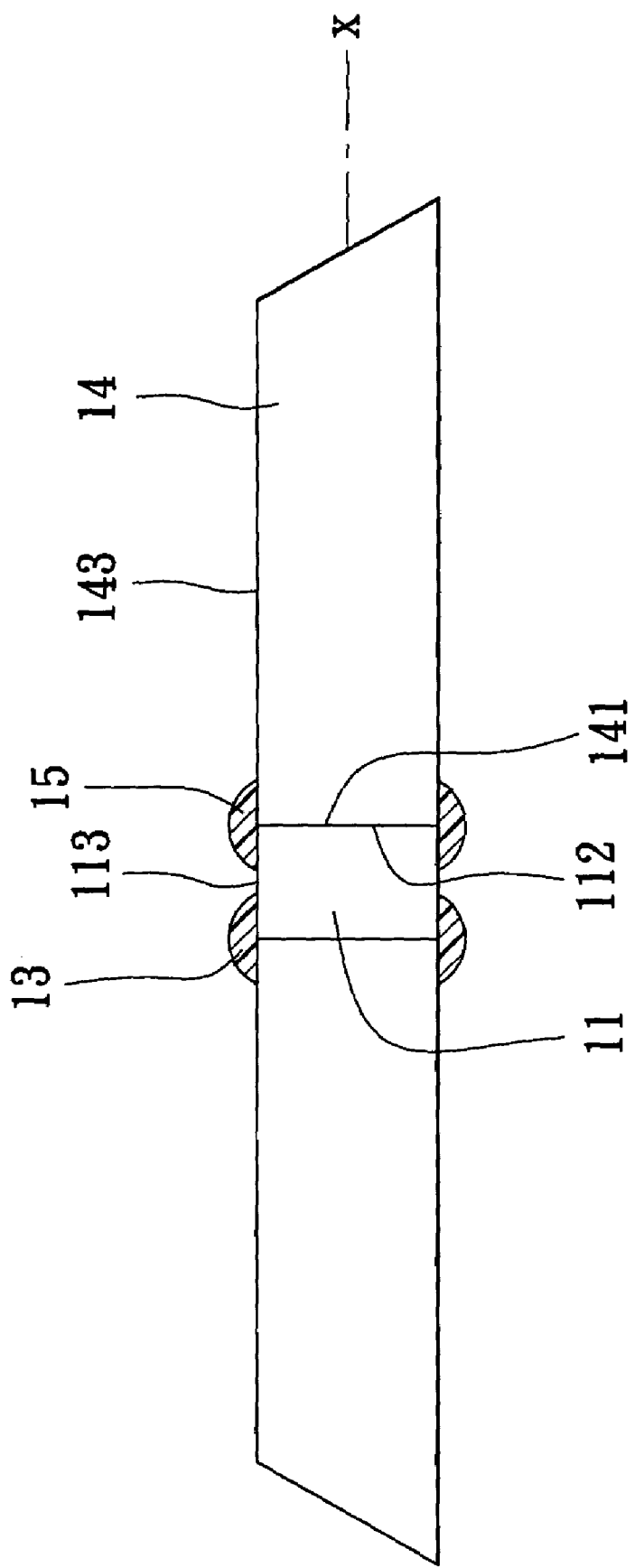

A second adhesive bond 15, which is likewise made from UV-curing epoxy, is formed on the surrounding wall surfaces 113, 143 of the optical filter component 11 and the second collimating lens 14 proximate to the second filter end surface 112 of the optical filter component 11 and the filter confronting end surface 141 of the second collimating lens 14 so as to fix the optical filter component 11 and the second collimating lens 14 together in the longitudinal direction (x), as best shown in FIG. 6.

Figure 7:
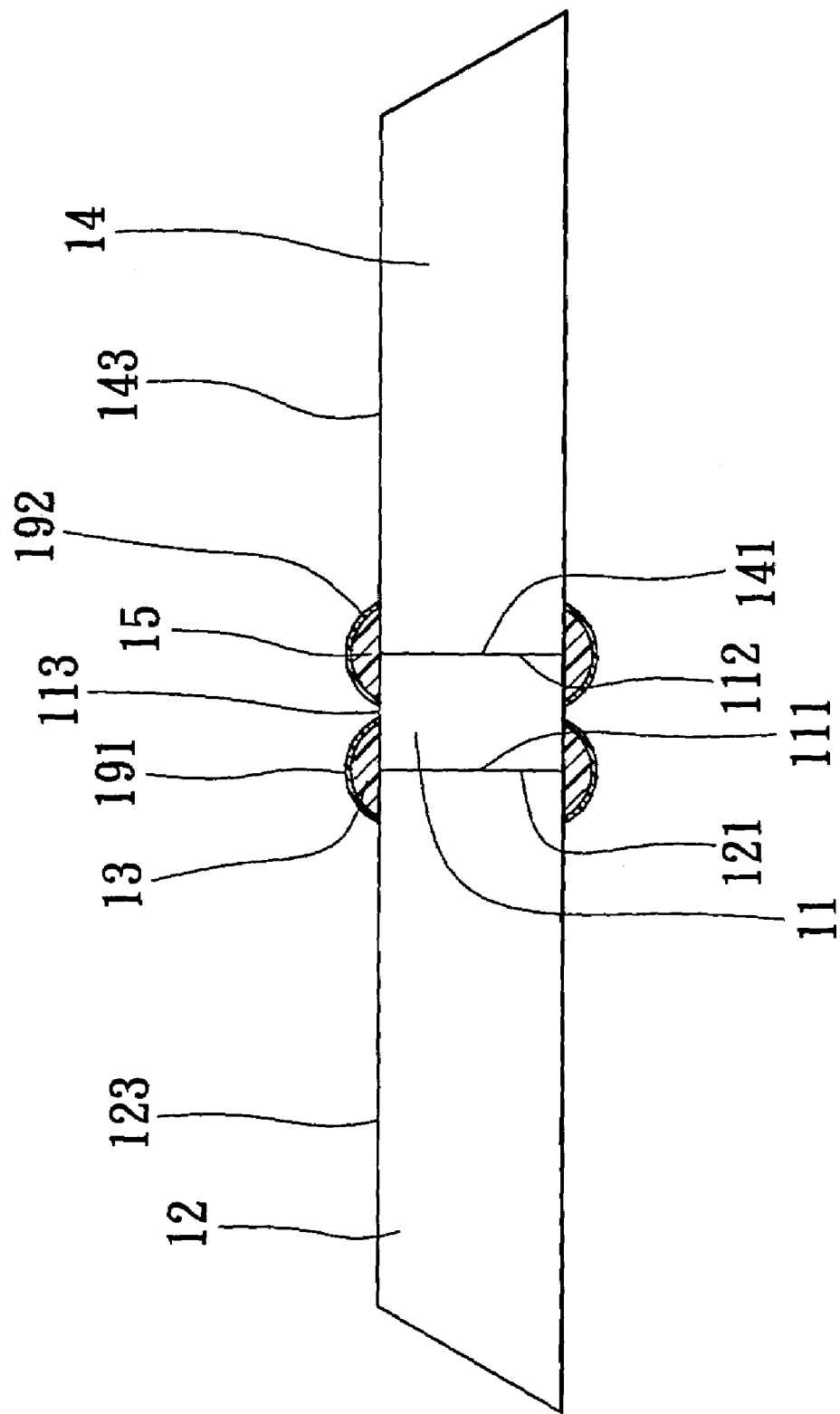

As best shown in FIG. 7, in the preferred embodiment, the optical collimating module 10 is further formed with first and second bond reinforcing layers 191, 192, each of which is made from heat-curing epoxy and encloses a respective one of the first and second adhesive bonds 13, 15 so as to reinforce the structural connections among the optical filter component 11 and the first and second collimating lenses 12, 14.

Referring again to FIGS. 3 and 4, the first fiber pigtail 16 is a dual fiber pigtail in this embodiment, and has a lens confronting end surface 161, a distal end surface 162 opposite to the lens confronting end surface 161 in the longitudinal direction (x), and a surrounding wall surface 163 extending between and interconnecting the lens confronting end surface 161 and the distal end surface 162. The first fiber pigtail 16 includes first and second optical fibers 164, 165. The second fiber pigtail 18 is a single fiber pigtail in this embodiment, and has a lens confronting end surface 181, a distal end surface 182 opposite to the lens confronting end surface 181 in the longitudinal direction (x), and a surrounding wall surface 183 extending between and interconnecting the lens confronting end surface 181 and the distal end surface 182. The second fiber pigtail 18 includes a single optical fiber 184.

Figure 9:
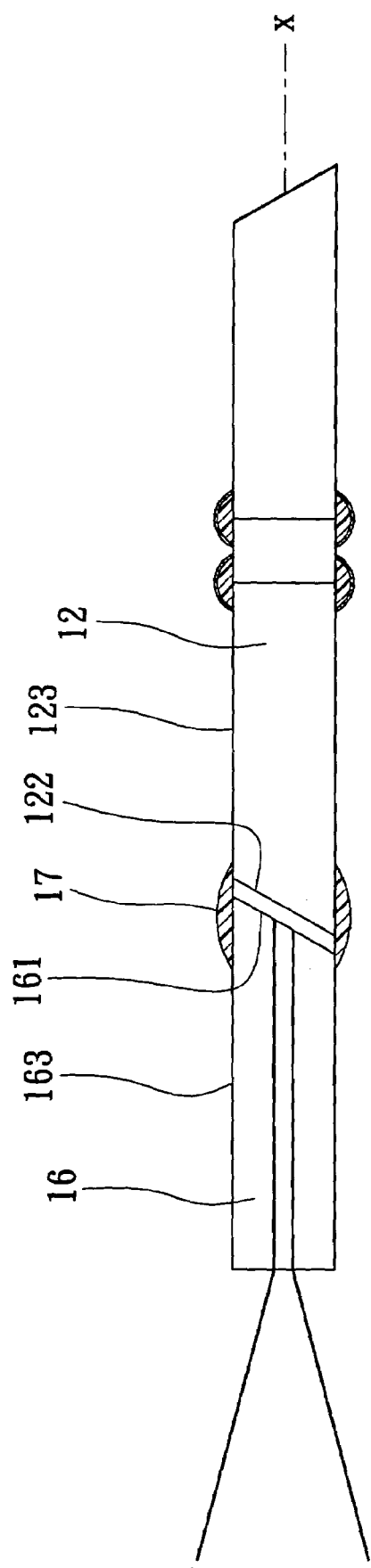

With further reference to FIG. 9, after adjusting the position of the first fiber pigtail 16 relative to the first collimating lens 12 so as to obtain a lowest possible reflection loss for the first fiber pigtail 16 (in a manner to be described hereinafter), a third adhesive bond 17, which is made from UV-curing epoxy, is formed on the surrounding wall surfaces 123, 163 of the first collimating lens 12 and the first fiber pigtail 16 proximate to the pigtail confronting end surface 122 of the first collimating lens 12 and the lens confronting end surface 161 of the first fiber pigtail 16 so as to fix the first collimating lens 12 and the first fiber pigtail 16 together in the longitudinal direction (x).

Figure 11:
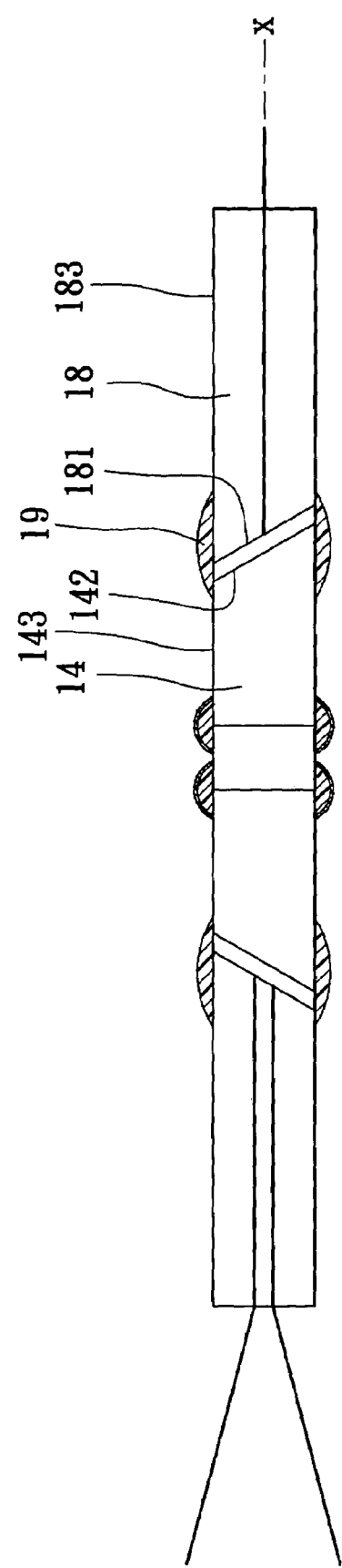

With further reference to FIG. 11, after adjusting the position of the second fiber pigtail 18 relative to the second collimating lens 14 so as to obtain a lowest possible insertion loss for the second fiber pigtail 18 (in a manner to be described hereinafter), a fourth adhesive bond 19, which is likewise made from UV-curing epoxy, is formed on the surrounding wall surfaces 143, 183 of the second collimating lens 14 and the second fiber pigtail 18 proximate to the pigtail confronting end surface 142 of the second collimating lens 14 and the lens confronting end surface 181 of the second fiber pigtail 18 so as to fix the second collimating lens 14 and the second fiber pigtail 18 together in the longitudinal direction (x).

Figure 12:
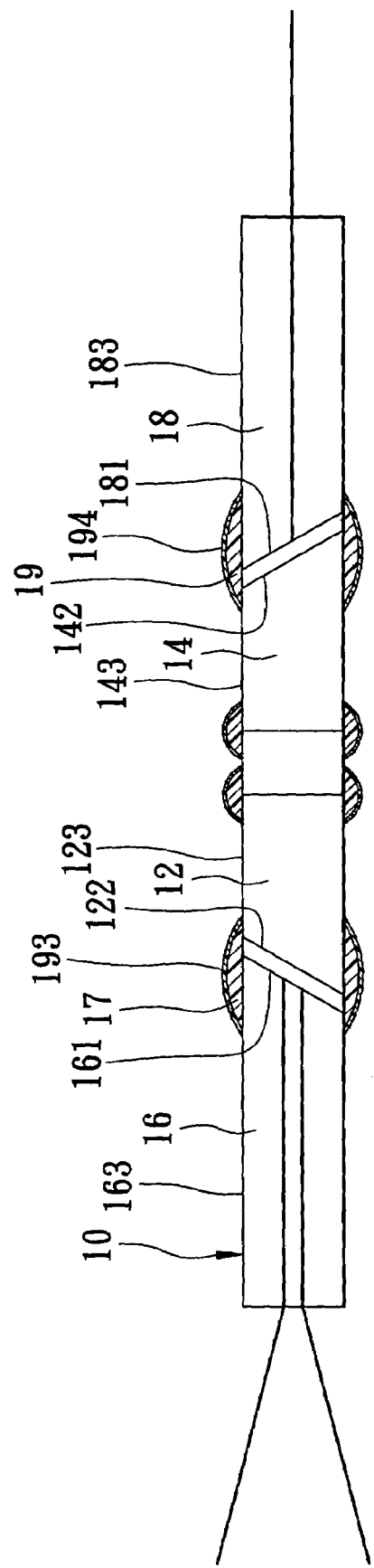

With further reference to FIG. 12, in the preferred embodiment, the optical collimating module 10 is further formed with third and fourth bond reinforcing layers 193, 194, each of which is made from heat-curing epoxy and encloses a respective one of the third and fourth adhesive bonds 17, 19 so as to reinforce the structural connections among the first and second collimating lenses 12, 14 and the first and second fiber pigtails 16, 18.

Referring again to FIG. 3, the outer tube unit 20 includes a tubular wall 21 defining a receiving space 22 that extends in the longitudinal direction (x), and first and second cap members 231, 232 provided respectively on opposite ends of the tubular wall 21 to seal the receiving space 22. The optical collimating module 10 is disposed in the receiving space 22. The optical fibers 164, 165 of the first fiber pigtail 16 extend through the first cap member 231, whereas the optical fiber 184 of the second fiber pigtail 18 extends through the second cap member 232.

In this embodiment, the tubular wall 21 forms a clearance with the surrounding wall surfaces 113, 123, 143, 163, 183 of the optical filter component 11, the first and second collimating lenses 12, 14, and the first and second fiber pigtails 16, 18. The positioning body 30, which is made from a resin material (e.g., a silicone-based resin material) that is applied on the surrounding wall surfaces 113, 123, 143, 163, 183 of the optical filter component 11, the first and second collimating lenses 12, 14, and the first and second fiber pigtails 16, 18, fills the clearance, has the first, second, third and fourth adhesive bonds 13, 15, 17, 19 and the first, second, third and fourth bond reinforcing layers 191, 192, 193, 194 embedded therein, and serves to position the optical collimating module 10 in the outer tube unit 20.

The method for making the WDM coupler of FIG. 3 includes the following steps:

1. Referring to FIG. 5, the first adhesive bond 13 is formed by applying the UV-curing epoxy on the surrounding wall surfaces 113, 123 of the optical filter component 11 and the first collimating lens 12 proximate to the first filter end surface 111 of the optical filter component 11 and the filter confronting end surface 121 of the first collimating lens 12, and by curing the UV-curing epoxy using an ultraviolet lamp (or ultraviolet gun), thereby fixing the optical filter component 11 and the first collimating lens 12 together in the longitudinal direction (x).

2. Thereafter, referring to FIG. 6, the second adhesive bond 15 is formed by applying the UV-curing epoxy on the surrounding wall surfaces 113, 143 of the optical filter component 11 and the second collimating lens 14 proximate to the second filter end surface 112 of the optical filter component 11 and the filter confronting end surface 141 of the second collimating lens 14, and by curing the UV-curing epoxy using an ultraviolet lamp (or ultraviolet gun), thereby fixing the optical filter component 11 and the second collimating lens 14 together in the longitudinal direction (x).

3. Subsequently, with reference to FIG. 7, the first and second bond reinforcing layers 191, 192 are formed by enclosing each of the first and second adhesive bonds 13, 15 with heat-curing epoxy, and by placing the assembly of the optical filter component 11 and the first and second collimating lenses 12, 14 thus formed in an oven to cure the heat-curing epoxies.

Figure 8:
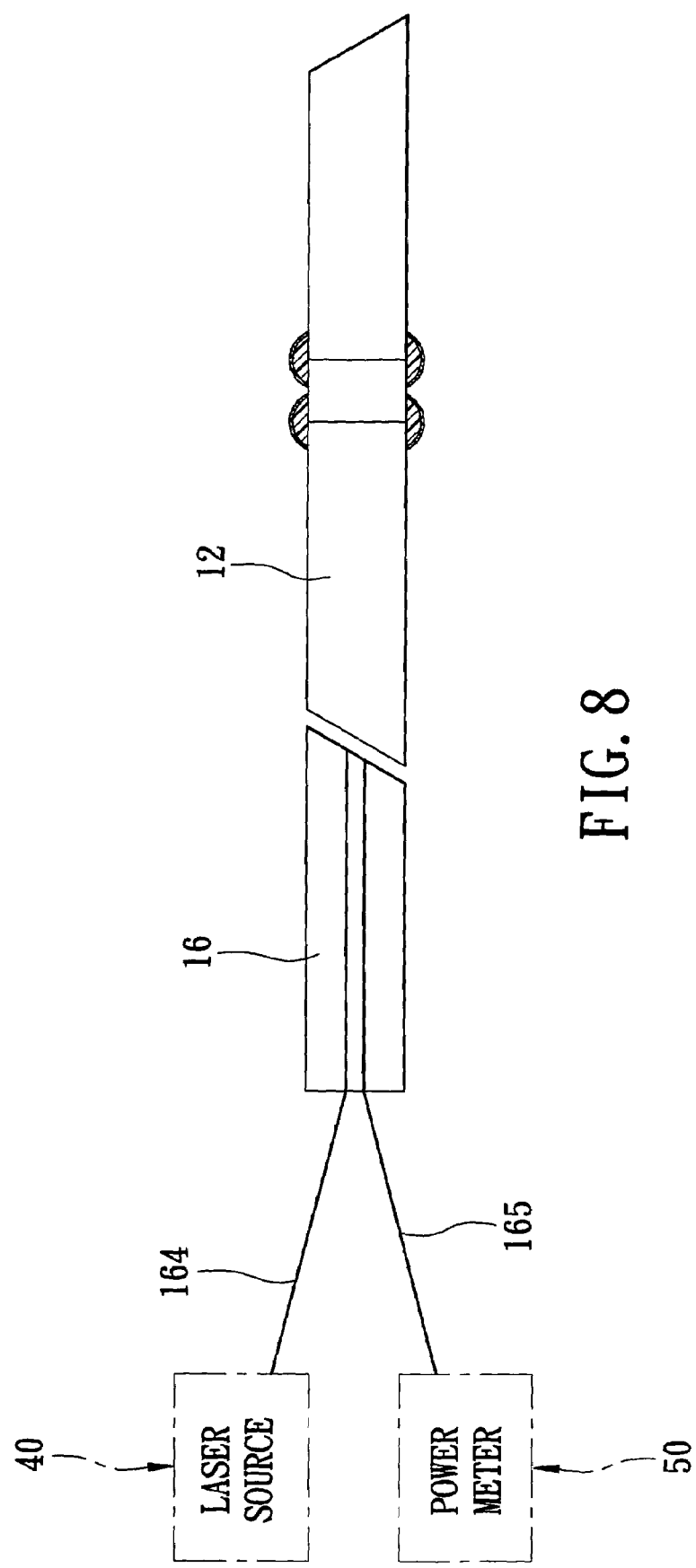

4. Then, the position of the first fiber pigtail 16 relative to the first collimating lens 12 is adjusted so as to obtain a lowest possible reflection loss for the first fiber pigtail 16. As shown in FIG. 8, a laser source 40 and a power meter 50 are connected respectively to the first and second optical fibers 164, 165 of the first fiber pigtail 16. The relative positions of the first fiber pigtail 16 and the first collimating lens 12 are then adjusted so that the output of the power meter 50 is at a maximum, which indicates a lowest possible reflection loss for the first fiber pigtail 16.

5. Thereafter, with reference to FIG. 9, the third adhesive bond 17 is formed by applying the UV-curing epoxy on the surrounding wall surfaces 123, 163 of the first collimating lens 12 and the first fiber pigtail 16 proximate to the pigtail confronting end surface 122 of the first collimating lens 12 and the lens confronting end surface 161 of the first fiber pigtail 16, and by curing the UV-curing epoxy using an ultraviolet lamp (or ultraviolet gun), thereby fixing the first collimating lens 12 and the first fiber pigtail 16 together in the longitudinal direction (x).

Figure 10:
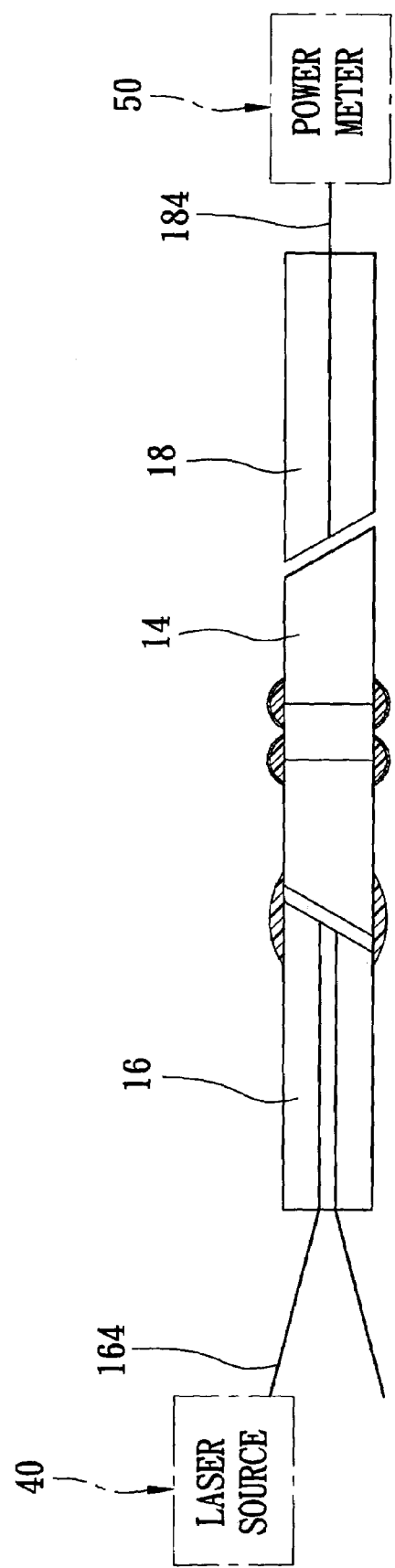

6. Next, the position of the second fiber pigtail 18 relative to the second collimating lens 14 is adjusted so as to obtain a lowest possible insertion loss for the second fiber pigtail 18. As shown in FIG. 10, the laser source 40 is connected to the first optical fiber 164 of the first fiber pigtail 16, and the power meter 50 is connected to the optical fiber 184 of the second fiber pigtail 18. The relative positions of the second fiber pigtail 18 and the second collimating lens 14 are then adjusted so that the output of the power meter 50 is at a maximum, which indicates a lowest possible insertion loss for the second fiber pigtail 18.

7. Subsequently, with further reference to FIG. 11, the fourth adhesive bond 19 is formed by applying the UV-curing epoxy on the surrounding wall surfaces 143, 183 of the second collimating lens 14 and the second fiber pigtail 18 proximate to the pigtail confronting end surface 142 of the second collimating lens 14 and the lens confronting end surface 181 of the second fiber pigtail 18, and by curing the UV-curing epoxy using an ultraviolet lamp (or ultraviolet gun), thereby fixing the second collimating lens 14 and the second fiber pigtail 18 together in the longitudinal direction (x).

8. Then, with reference to FIG. 12, the third and fourth bond reinforcing layers 193, 194 are formed by enclosing each of the third and fourth adhesive bonds 17, 19 with heat-curing epoxy, and by placing the optical collimating module 10 thus formed in an oven to cure the heat-curing epoxies.

9. Thereafter, with reference to FIG. 13, a layer of resin material, which is a silicone-based resin material in this embodiment, is applied on the surrounding wall surfaces 113, 123, 143, 163, 183 of the optical filter component 11, the first and second collimating lenses 12, 14, and the first and second fiber pigtails 16, 18 such that the first, second, third and fourth adhesive bonds 13, 15, 17, 19 and the first, second, third and fourth bond reinforcing layers 191, 192, 193, 194 are embedded in the layer of resin material.

Figure 13:
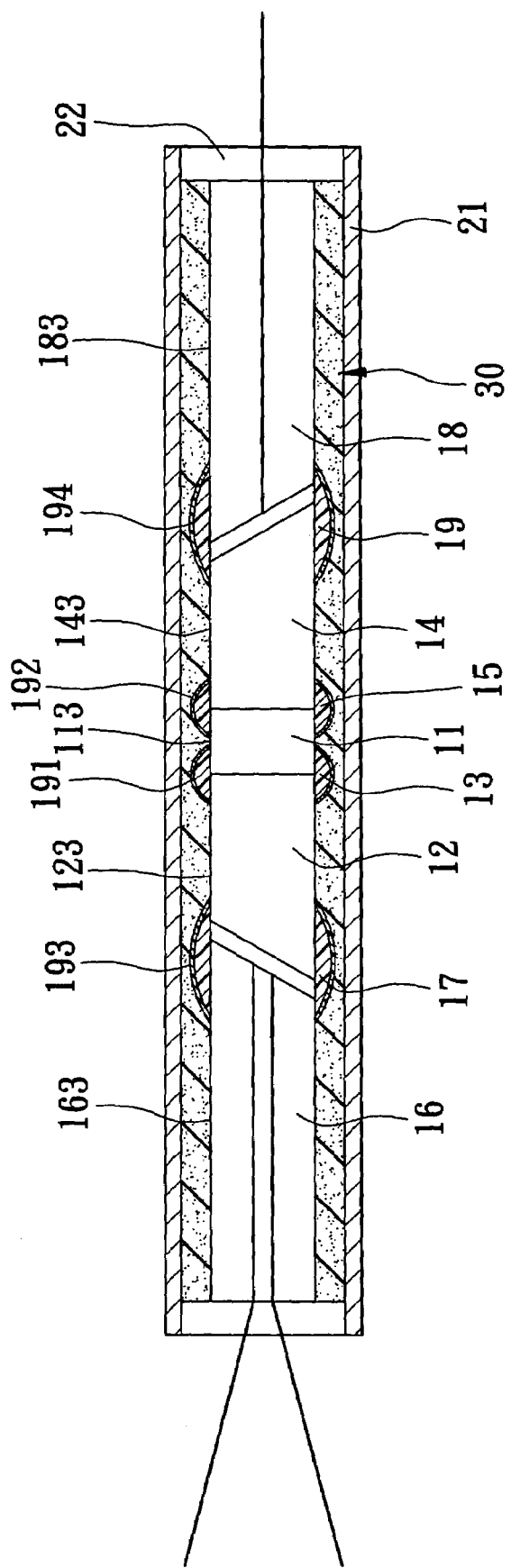

10. Next, as shown in FIG. 13, the optical collimating module 10 applied with the layer of resin material is disposed in the receiving space 22 defined by the tubular wall 21 of the outer tube unit 20, and the layer of resin material is allowed to harden so as to form the positioning body 30 that serves to fix the optical collimating module 10 in the outer tube unit 20. It is noted that since the optical characteristics of the optical collimating module 10 are already set through the first, second, third and fourth adhesive bonds 13, 15, 17, 19 before the optical collimating module 10 is inserted into the tubular wall 21 of the outer tube unit 20, there is no need to align the optical axis of the optical collimating module 10 with the axis of the outer tube unit 20.

11. Finally, with reference to FIG. 3, the first and second cap members 231, 232 are formed on the opposite ends of the tubular wall 21 of the outer tube unit 20 to seal the receiving space 22. In this embodiment, each of the first and second cap members 231, 232 is formed by applying a resin material, such as silicone-based resin material, to each of the opposite ends of the tubular wall 21 while allowing the first and second optical fibers 164, 165 of the first fiber pigtail 16 and the optical fiber 184 of the second fiber pigtail 18 to extend out of the receiving space 22. The first and second cap members 231, 232 are formed when the resin materials at the opposite ends of the tubular wall 21 of the outer tube unit 20 harden.

The following are some of the advantages of the WDM coupler according to this invention:

1. The first, second, third and fourth adhesive bonds 13, 15, 17, 19 for bonding together the various components of the optical collimating module 10, i.e., the optical filter component 11, the first and second collimating lenses 12, 14, and the first and second fiber pigtails 16, 18, are made from UV-curing epoxy, which has a faster curing time as compared to heat-curing epoxy. Hence, since the UV-curing epoxy is unlikely to spread over the corresponding confronting end surfaces of the different components of the optical collimating module 10 during its curing process, an adverse affect upon the optical signal transmission quality can be avoided. In addition, because the first, second, third and fourth bond reinforcing layers 191, 192, 193, 194, which are made from heat-curing epoxy, are formed only after formation of the first, second, third and fourth adhesive bonds 13, 15, 17, 19, the structural connections among the various components of the optical collimating module 10 can be reinforced while preventing the heat-curing epoxy from spreading over the confronting end surfaces of the different components of the optical collimating module 10 during the curing process.

Figure 1:
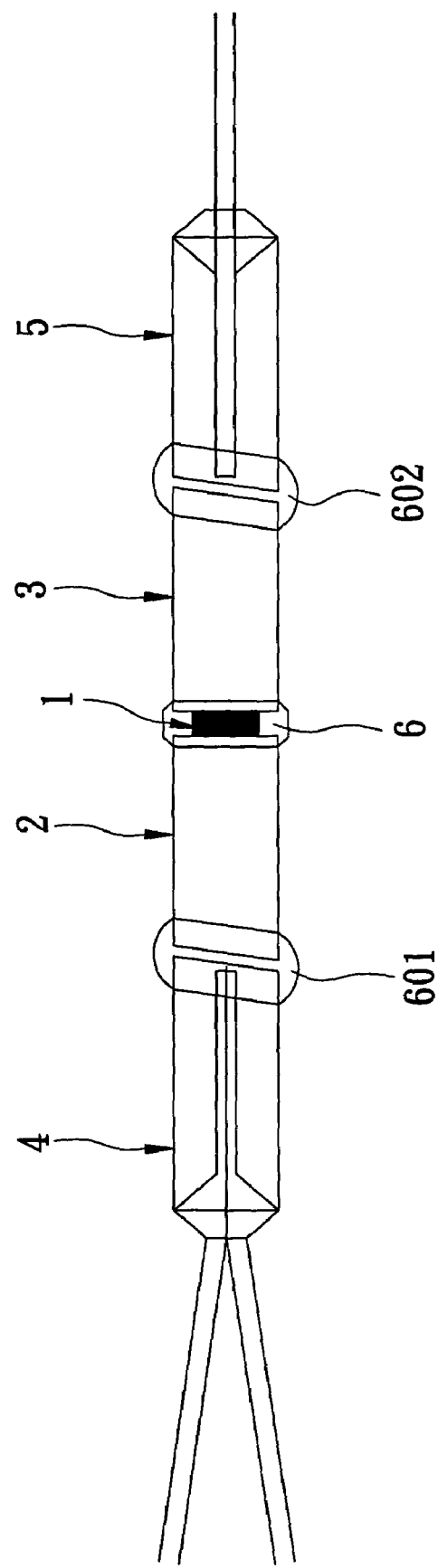
FIG. 1 is a schematic view of a conventional WDM coupler.
Figure 2:
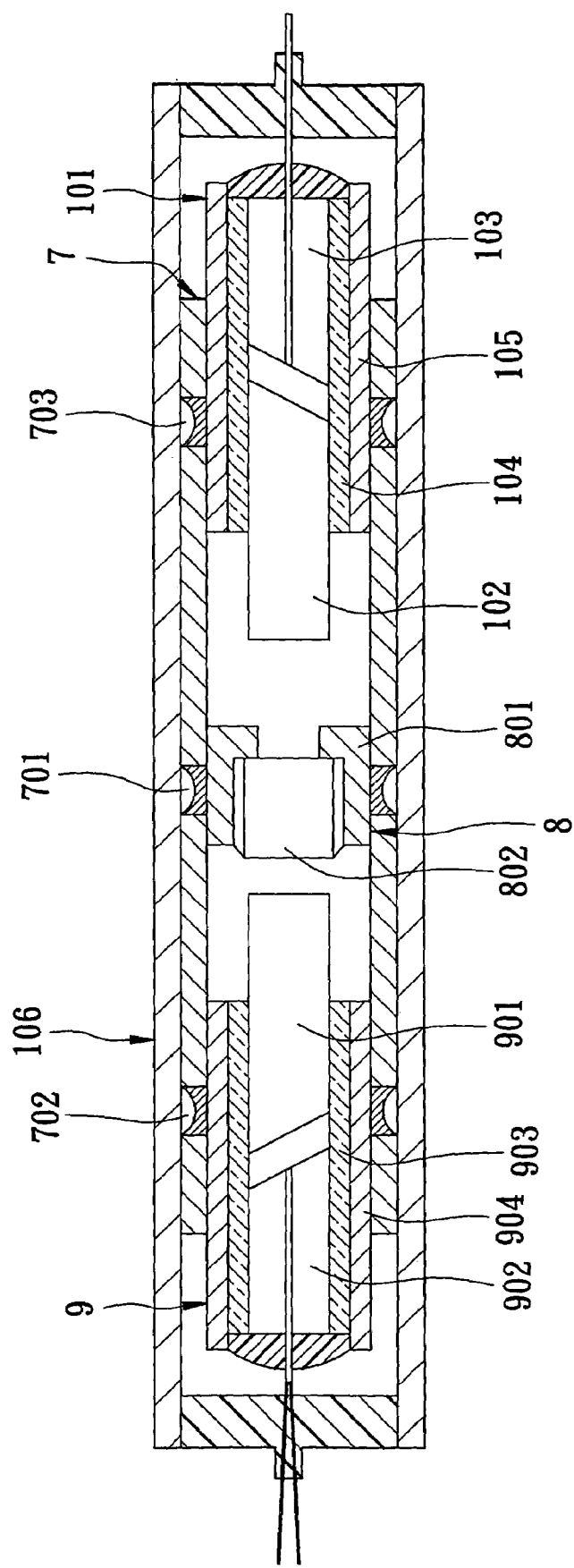
FIG. 2 is a partly sectional, schematic view of another conventional WDM coupler.

2. Because the optical filter component 11, the first and second collimating lenses 12, 14, and the first and second fiber pigtails 16, 18 are fixed in place by the first, second, third and fourth adhesive bonds 13, 15, 17, 19, there is no need for the additional components, i.e., the glass tubes 903, 104, the collimator tubes 904, 105, and the inner metal tube 7, of the conventional WDM coupler shown in FIG. 2. There is only the need to dispose the optical collimating module 10 in the outer tube unit 20 in the WDM coupler of this invention. Therefore, the WDM coupler of this invention has a simpler structure and smaller radial dimensions as compared to the conventional WDM coupler of FIG. 2. Moreover, because there is no need to fill weld holes with solder material in the WDM coupler of this invention, the manufacturing process is less time-consuming as compared to the conventional WDM coupler of FIG. 2, and damage to the different components due to heat generated during the welding operations in the conventional WDM coupler of FIG. 2 can be avoided.

3. As compared to the conventional WDM coupler of FIG. 2, which requires assembly of separate components, i.e., the optical filter unit 8 and the dual and single fiber collimators 9, 101, in the inner metal tube 7, the optical collimating module 10 of the WDM coupler of this invention is assembled beforehand before positioning the same in the outer tube unit 20. The method for making the WDM coupler of this invention is thus simpler and can be completed within a shorter amount of time.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A wavelength division multiplexed (WDM) coupler comprising:
   an outer tube unit; and
   an optical collimating module disposed in said outer tube unit and including
      an optical filter component having first and second filter end surfaces opposite to each other in a longitudinal direction, and a surrounding wall surface extending between and interconnecting said first and second filter end surfaces,
      first and second collimating lenses, each of which has a filter confronting end surface, a pigtail confronting end surface opposite to said filter confronting end surface in the longitudinal direction, and a surrounding wall surface extending between and interconnecting said filter confronting end surface and said pigtail confronting end surface,
      a first adhesive bond made from UV-curing epoxy and formed on said surrounding wall surfaces of said optical filter component and said first collimating lens proximate to said first filter end surface of said optical filter component and said filter confronting end surface of said first collimating lens so as to fix said optical filter component and said first collimating lens together in the longitudinal direction,
      a second adhesive bond made from UV-curing epoxy and formed on said surrounding wall surfaces of said optical filter component and said second collimating lens proximate to said second filter end surface of said optical filter component and said filter confronting end surface of said second collimating lens so as to fix said optical filter component and said second collimating lens together in the longitudinal direction,
      first and second fiber pigtails, each of which has a lens confronting end surface, a distal end surface opposite to said lens confronting end surface in die longitudinal direction, and a surrounding wall surface extending between and interconnecting said lens confronting end surface and said distal end surface,
      a third adhesive bond made from (N-curing epoxy and formed on said surrounding wall surfaces of said first collimating lens and said first fiber pigtail proximate to said pigtail confronting end surface of said first collimating lens and said lens confronting end surface of said first fiber pigtail so as to fix said first collimating lens and said first fiber pigtail together in the longitudinal direction, and
      a fourth adhesive bond made from UV-curing epoxy and formed on said surrounding wall surfaces of said second collimating lens and said second fiber pigtail proximate to said pigtail confronting end surface of said second collimating lens and said lens confronting end surface of said second fiber pigtail so as to fix said second collimating lens and said second fiber pigtail together in the longitudinal direction,
   wherein said optical collimating module further includes;
      a first bond reinforcing layer made from heat-curing epoxy and enclosing said first adhesive bond,
      a second bond reinforcing layer made from heat-curing epoxy and enclosing said second adhesive bond,
      a third bond reinforcing layer made from heat-curing epoxy and enclosing said third adhesive bond,
      a fourth bond reinforcing layer made from heat-curing enoxy and enclosing said fourth adhesive bond; and
   wherein
      said outer tube unit includes a tubular wall defining a receiving space that extends in the longitudinal direction, and first and second cap members provided respectively on opposite ends of said tubular wall to seal said receiving space;
      said optical collimating module being disposed in said receiving space;
      said first fiber pigtail including at least one optical fiber that extends through one of said first and second cap members;
      said second fiber pigtail including at least one optical fiber that extends through the other of said first and second cap members;
      said tubular wall forms a clearance with said surrounding wall surfaces of said optical filter component, said first and second collimating lenses, and said first and second fiber pigtails; and
      said WDM coupler further comprising a positioning body that fills said clearance, that has said first, second, third and fourth adhesive bonds and said first, second, third and fourth bond reinforcing layers embedded therein, and that serves to position said optical collimating module in said outer tube unit.

2. The WDM coupler of claim 1, wherein said positioning body is made from a resin material.

3. The WDM coupler of claim 2, wherein the resin material is a silicone-based resin material.

4. The WDM coupler of claim 1, wherein each of said first and second cap members is made from a resin material.

5. The WDM coupler of claim 4, wherein the resin material is a silicone-based resin material.

6. The WDM coupler of claim 1, wherein each of said first and second collimating lenses is a gradient-index lens.

7. The WDM coupler of claim 1, wherein one of said first and second fiber pigtails is a dual fiber pigtail, and the other of said first and second fiber pigtails is a single fiber pigtail.

8. A method for making a wavelength division multiplexed (WDM) coupler, comprising:
   A) forming an optical collimating module including
      a) forming a first adhesive bond for fixing an optical filter component and a first collimating lens together in a longitudinal direction by applying UV-caring epoxy on surrounding wall surfaces of the optical filter component and the first collimating lens proximate to a first filter end surface of the optical filter component and a filter confronting end surface of the first collimating lens, and by subsequently curing the UV-curing epoxy, b) forming a second adhesive bond for fixing the optical filter component and a second collimating lens together in the longitudinal direction by applying the UV-curing epoxy on the surrounding wall surface of the optical filter component proximate to a second filter end surface of the optical filter component that is opposite to the first filter end surface in the longitudinal direction, and on a surrounding wall surface of the second collimating lens proximate to a filter confronting end surface of the second collimating lens, and by subsequently curing the UV-curing epoxy, c) forming a third adhesive bond for fixing the first collimating lens and a first fiber pigtail together in the longitudinal direction by applying the UV-curing epoxy on the surrounding wall surface of the first collimating lens proximate to a pigtail confronting end surface of the first collimating lens that is opposite to the optical filter component in the longitudinal direction, and on a surrounding wall surface of the first fiber pigtail proximate to a lens confronting end surface of the first fiber pigtail, and by subsequently curing the UV-curing epoxy, and d) forming a fourth adhesive bond for fixing the second collimating lens and a second fiber pigtail together in the longitudinal direction by applying the UV-curing epoxy on the surrounding wall surface of the second collimating lens proximate to a pigtail confronting end surface of the second collimating lens that is opposite to the optical filter component in the longitudinal direction, and on a surrounding wall surface of the second fiber pigtail proximate to a lens confronting end surface of the second fiber pigtail, and by subsequently curing the UV-curing epoxy; and B) disposing the optical collimating module in an outer tube unit, wherein said step A) further includes, after sub-step b) forming first and second bond reinforcing layers by enclosing the first and second adhesive bonds with heat-curing epoxies, respectively, and by curing the heat-curing epoxies, and wherein said step A) further includes, after sub-step d) forming third and fourth bond reinforcing layers by enclosing the third and fourth adhesive bonds with heat-curing epoxies, respectively, and by curing the heat-curing epoxies, and wherein said step B) includes:

i) applying a layer of resin material on the surrounding wall surfaces of the optical filter component, the first and second collimating lenses, and the first and second fiber pigtails of the optical collimating module such that the first, second, third and fourth adhesive bonds and the first, second, third and fourth bond reinforcing layers are embedded in the layer of resin material; and ii) disposing the optical collimating module applied with the layer of resin material in a receiving space defined by a tubular wall of the outer tube unit and allowing the layer of resin material to harden so as to form a positioning body for fixing the optical collimating module in the outer tube unit.

9. The method of claim 8, wherein said step B) includes:

i) disposing the optical collimating module in a receiving space defined by a tubular wall of the outer tube unit; and ii) forming cap members on opposite ends of the tubular wall of the outer tube unit to seal the receiving space.

10. The method of claim 8, wherein the first fiber pigtail is a dual fiber pigtail, and said step A) further includes, prior to sub-step c), adjusting position of the first fiber pigtail relative to the first collimating lens so as to reduce reflection loss for the first fiber pigtail to a minimum.

11. The method of claim 10, wherein the second fiber pigtail is a single fiber pigtail, and said step A) further includes, prior to sub-step d), adjusting position of the second fiber pigtail relative to the second collimating lens so as to reduce insertion loss for the second fiber pigtail to a minimum.

12. A method for making a wavelength division multiplexed (WDM) coupler, comprising:

A) forming an optical collimating module including a) forming a first adhesive bond for fixing an optical filter component and a first collimating lens together in a longitudinal direction by applying UV-curing epoxy on surrounding wall surfaces of the optical filter component and the first collimating lens proximate to a first filter end surface of the optical filter component and a filter confronting end surface of the first collimating lens, and by subsequently curing the UV-curing epoxy, b) forming a second adhesive bond for fixing the optical filter component and a second collimating lens together in the longitudinal direction by applying the UV-curing epoxy on the surrounding wall surface of the optical filter component proximate to a second filter end surface of the optical filter component that is opposite to the first filter end surface in the longitudinal direction, and on a surrounding wall surface of the second collimating lens proximate to a filter confronting end surface of the second collimating lens, and by subsequently curing the UV-curing epoxy, c) forming a third adhesive bond for fixing the first collimating lens and a first fiber pigtail together in the longitudinal direction by applying the UV-curing epoxy on the surrounding wall surface of the first collimating lens proximate to a pigtail confronting end surface of the first collimating lens that is opposite to the optical filter component in the longitudinal direction, and on a surrounding wall surface of the first fiber pigtail proximate to a lens confronting end surface of the first fiber pigtail, and by subsequently curing the UV-curing epoxy, and d) forming a fourth adhesive bond for fixing the second collimating lens and a second fiber pigtail together in the longitudinal direction by applying the UV-curing epoxy on the surrounding wall surface of the second collimating lens proximate to a pigtail confronting end surface of the second collimating lens that is opposite to the optical filter component in the longitudinal direction, and on a surrounding wall surface of the second fiber pigtail proximate to a lens confronting end surface of the second fiber pigtail, and by subsequently curing the UV-curing epoxy: and B) disposing the optical collimating module in an outer tube unit and, forming cap members on opposite ends of a tubular wall of the outer tube unit to seal a receiving space, wherein
each of the cap members is formed by applying resin materials to the opposite ends of the tubular wall, respectively, while allowing optical fibers of the first and second fiber pigtails to extend out of the receiving space, and by subsequently allowing the resin materials at the opposite ends of the tubular wall to harden.

* * * * *